(12) United States Patent
Jung

(10) Patent No.: US 10,228,578 B2
(45) Date of Patent: Mar. 12, 2019

(54) DISPLAY DEVICE CAPABLE OF PREVENTING COUPLING STRUCTURES OF COMPONENTS FROM BEING EXPOSED OUTSIDE THE HOUSING THEREOF

(71) Applicant: NEW OPTICS, LTD., Yangju-si, Gyeonggi-do (KR)

(72) Inventor: Won Joon Jung, Yangju-si (KR)

(73) Assignee: NEW OPTICS, LTD., Yangju-si, Gyeonggi-do (KR)

( * ) Notice: Subject to any disclaimer, the term of this patent is extended or adjusted under 35 U.S.C. 154(b) by 159 days.

(21) Appl. No.: 14/907,747

(22) PCT Filed: Jan. 21, 2016

(86) PCT No.: PCT/KR2016/000679
§ 371 (c)(1),
(2) Date: Jan. 26, 2016

(87) PCT Pub. No.: WO2016/117952
PCT Pub. Date: Jul. 28, 2016

(65) Prior Publication Data
US 2016/0363801 A1     Dec. 15, 2016

(30) Foreign Application Priority Data
Jan. 21, 2015 (KR) .................. 10-2015-0009991

(51) Int. Cl.
*G02F 1/1333* (2006.01)
*G02F 7/00* (2006.01)
(Continued)

(52) U.S. Cl.
CPC ..... *G02F 1/133308* (2013.01); *G02B 6/0051* (2013.01); *G02B 6/0053* (2013.01);
(Continued)

(58) Field of Classification Search
CPC combination set(s) only.
See application file for complete search history.

(56) References Cited

U.S. PATENT DOCUMENTS

| 2012/0162569 A1* | 6/2012 | Sekiguchi | G02F 1/133308 349/58 |
| 2012/0224117 A1* | 9/2012 | Miyazaki | G02F 1/13318 349/58 |
| 2014/0285746 A1* | 9/2014 | Huang | G02F 1/133512 349/58 |

* cited by examiner

*Primary Examiner* — Lauren Nguyen
(74) *Attorney, Agent, or Firm* — Novick, Kim & Lee, PLLC; Jae Youn Kim

(57) ABSTRACT

The present invention relates to a display apparatus and a housing thereof. According to one aspect of the present invention, the housing includes a case top including a bezel part to cover edges of a front surface of a display panel, an upper side wall bent in a rear direction from an outer portion of the bezel part to cover an upper portion of a lateral side of a display apparatus, a link wall part bent inward from the upper side wall part, and a lower sidewall part extending in the rear direction from the link wall part, a cover bottom including a bottom part to cover a rear surface of the display apparatus and an inner sidewall part extending in a forward direction from an outer portion of the bottom part, and screw-coupled to an inner portion of the lower sidewall part to be provided in a shape of an open box, and a side frame provided at an outer portion of the lower sidewall part to cover a lower lateral side of the display apparatus to prevent the screw-coupling from being viewed through an outer portion of the display apparatus.

16 Claims, 7 Drawing Sheets

(51) Int. Cl.
 *F21V 8/00* (2006.01)
 *F21V 7/00* (2006.01)
(52) U.S. Cl.
 CPC ......... *G02B 6/0055* (2013.01); *G02B 6/0086* (2013.01); *G02B 6/005* (2013.01); *G02F 2001/13332* (2013.01); *G02F 2001/133314* (2013.01); *G02F 2001/133317* (2013.01); *G02F 2201/46* (2013.01)

DISPLAY DEVICE CAPABLE OF PREVENTING COUPLING STRUCTURES OF COMPONENTS FROM BEING EXPOSED OUTSIDE THE HOUSING THEREOF

TECHNICAL FIELD

The present invention relates to a display apparatus and a housing thereof, and more particularly to a display apparatus and a housing thereof, capable of preventing the coupling structure between components from being exposed through an outer portion of an article.

BACKGROUND ART

Recently, the demand for design elements has been gradually increased in the field of flat panel displays (FPDs). In particular, since display articles have been utilized as interior decoration items, display articles having external appearance like picture frames have been launched in the market. In order to realize the frame-shaped displays, studies and researches have recently been performed on narrow bezel and ultra-thin housing structures.

In a convention display device, a case top and a cover bottom are coupled to each other using a coupling member, such as a screw or a nut. In this case, the screw and the nut are exposed to the outer portion of the display device, so that the aesthetic sensibility for the article may be reduced.

DISCLOSURE

Technical Problem

An object of the present invention is to provide a display apparatus and a housing thereof, capable of preventing the coupling structure between components from being exposed through an outer portion of an article.

Objects of the present invention may not be limited to the above, and other objects will be clearly understandable to those having ordinary skill in the art from the disclosures provided below together with accompanying drawings.

Technical Solution

According to one aspect of the present invention, there may be provided a housing including a case top including a bezel part to cover edges of a front surface of a display panel, an upper side wall bent in a rear direction from an outer portion of the bezel part to cover an upper portion of a lateral side of a display apparatus, a link wall part bent inward from the upper side wall part, and a lower sidewall part extending in the rear direction from the link wall part, a cover bottom including a bottom part to cover a rear surface of the display apparatus and an inner sidewall part extending in a forward direction from an outer portion of the bottom part, and screw-coupled to an inner portion of the lower sidewall part to be provided in a shape of an open box, and a side frame provided at an outer portion of the lower sidewall part to cover a lower lateral side of the display apparatus to prevent the screw-coupling from being exposed through an outer portion of the display apparatus.

According to another aspect of the present invention, there may be provided a display apparatus including a display panel to output an image, a backlight unit to supply light to the display panel, and a housing to receive the display panel and the backlight unit therein and to form an outer appearance of a product. The housing includes a case top including a bezel part to cover edges of a front surface of the display panel, an upper side wall bent in a rear direction from an outer portion of the bezel part to cover an upper portion of a lateral side of the display apparatus, a link wall part bent inward from the upper side wall part, and a lower sidewall part extending in the rear direction from the link wall part, a cover bottom including a bottom part to cover a rear surface of the display apparatus and an inner sidewall part extending in a forward direction from an outer portion of the bottom part, and screw-coupled to an inner portion of the lower sidewall part to be provided in a shape of an open box, and a side frame provided at an outer portion of the lower sidewall part to cover a lower lateral side of the display apparatus to prevent the screw-coupling from being exposed through an outer portion of the display apparatus.

Technical solutions of the present invention may not be limited to the above, and other technical solutions of the present invention will be clearly understandable to those having ordinary skill in the art from the disclosures provided below together with accompanying drawings.

Advantageous Effects

As described above, according to the present invention, the side frame covers the coupling part between the case top and the cover bottom to prevent coupling members, such as a screw, a nut, and a bolt, which are used to couple the case top to the cover bottom, from being exposed through the outer portion of the display apparatus.

Effects of the present invention may not be limited to the above, and other effects of the present invention will be clearly understandable to those having ordinary skill in the art from the disclosures provided below together with accompanying drawings.

BEST MODE

Mode for Invention

Figure 1:
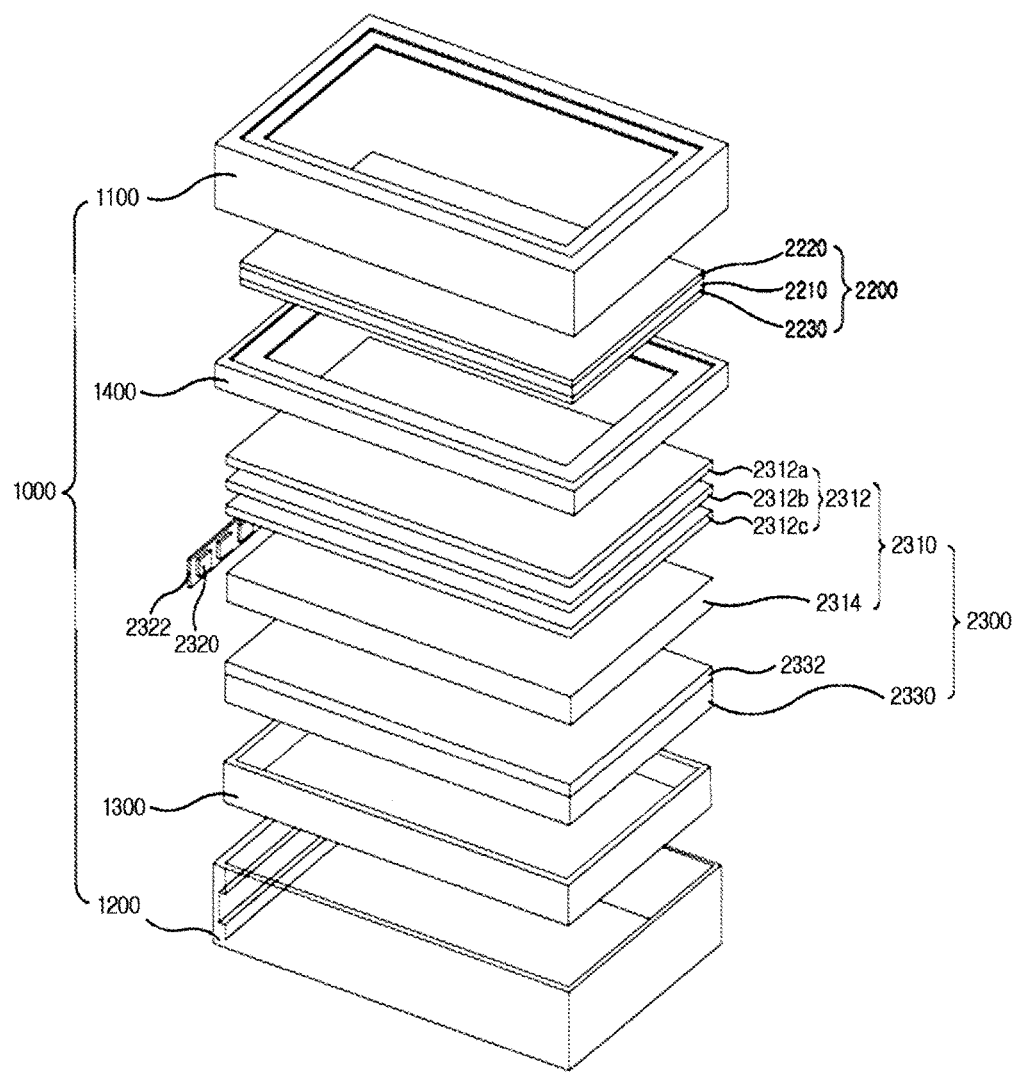
FIG. 1 is an exploded perspective view showing a display apparatus according to one embodiment of the present invention.

Embodiments described in this specification are made to clearly explain the scope of the invention to those having ordinary skill in the art, and do not intend to limit the present invention. It should be interpreted that the present invention may include substitutions and modifications within the technical scope of the present invention.

The terms used in this specification are selected from general terms, which are widely used currently, based on functions of components according to the embodiment of the present invention, and may have meanings varying according to the intentions of those skilled in the art, the custom in the field of art or advent of new technology. If a specific term is used with a specific meaning, the meaning of the term will be described specifically. Accordingly, the terms used in this specification should not be defined as simple names of the components, but be defined based on the actual meaning of the terms and the whole context throughout the present specification.

The accompanying drawings are to facilitate the explanation of the present invention and the shape in the drawings may be exaggerated for the purpose of convenience of explanation, so the present invention should not be limited to the drawings.

In addition, the details of the generally known function and structure, which make the subject matter of the present invention unclear, will be omitted.

According to one aspect of the present invention, there may be provided a housing including a case top including a bezel part to cover edges of a front surface of a display panel, an upper side wall bent in a rear direction from an outer portion of the bezel part to cover an upper portion of a lateral side of a display apparatus, a link wall part bent inward from the upper side wall part, and a lower sidewall part extending in the rear direction from the link wall part, a cover bottom including a bottom part to cover a rear surface of the display apparatus and an inner sidewall part extending in a forward direction from an outer portion of the bottom part, and screw-coupled to an inner portion of the lower sidewall part to be provided in a shape of an open box, and a side frame provided at an outer portion of the lower sidewall part to cover a lower lateral side of the display apparatus to prevent the screw-coupling from being exposed through an outer portion of the display apparatus.

In addition, the side frame may include an outer sidewall part that extends from a lower end of the upper sidewall part to a lower end of the inner sidewall part to cover the lower lateral side of the display apparatus.

Further, the outer sidewall part may be positioned in line with an outer surface of the upper sidewall part.

In addition, the side frame may include a rear edge part that extends from a lower end of the outer sidewall part to an outer portion of the bottom part to cover an edge of the rear surface of the display apparatus such that the side frame is provided in an L shape.

In addition, the side frame may be provided in a shape of a rectangular frame to surround the lower sidewall part when viewed from a front view.

In addition, the side frame may be provided in a shape of a rectangular frame having one region that is open when viewed a front view.

Further, the side frame may be coupled to the case top at both end portions of the one region that is open.

In addition, the housing may further include an illuminance sensor mounted on the case top through the one region to detect external illuminance.

In addition, the housing may further include a receiving module mounted on the case top through the one region to receive a remote control signal or a short-distance signal.

Further, the housing may further include a guide frame interposed between the lower sidewall part and the inner sidewall part to support an optical member.

According to another aspect of the present invention, there is provide a display apparatus including a display panel to output an image, a backlight unit to supply light to the display panel, and a housing to receive the display panel and the backlight unit therein and to form an outer appearance of a product. The housing may include a case top including a bezel part to cover edges of a front surface of the display panel, an upper side wall bent in a rear direction from an outer portion of the bezel part to cover an upper portion of a lateral side of the display apparatus, a link wall part bent inward from the upper side wall part, and a lower sidewall part extending in the rear direction from the link wall part, a cover bottom including a bottom part to cover a rear surface of the display apparatus and an inner sidewall part extending in a forward direction from an outer portion of the bottom part, and screw-coupled to an inner portion of the lower sidewall part to be provided in a shape of an open box, and a side frame provided at an outer portion of the lower sidewall part to cover a lower lateral side of the display apparatus to prevent the screw-coupling from being exposed through an outer portion of the display apparatus.

In addition, the side frame may include an outer sidewall part that extends from a lower end of the upper sidewall part to a lower end of the inner sidewall part to cover the lower lateral side of the display apparatus.

In addition, the outer sidewall part may be positioned in line with an outer surface of the upper sidewall part.

Further, the side frame may include a rear edge part that extends from a lower end of the outer sidewall part to an outer portion of the bottom part to cover an edge of the rear surface of the display apparatus such that the side frame is provided in an L shape.

Further, the side frame may be provided in a shape of a rectangular frame to surround the lower sidewall part when viewed from a front view.

In addition, the side frame may be provided in a shape of a rectangular frame having one region that is open when viewed a front view.

Further, the side frame may be coupled to the case top at both end portions of the one region that is open.

In addition, the display apparatus may further include an illuminance sensor mounted on the case top through the one region to detect external illuminance.

In addition, the display apparatus may include a receiving module mounted on the case top through the one region to receive a remote control signal or a short-distance signal.

Further, the display apparatus may further include a guide frame interposed between the lower sidewall part and the inner sidewall part to support an optical member.

Hereinafter, a display apparatus 2000 according to the embodiment of the present invention will be described.

The display apparatus 2000 is a device to output an image. Representatively, the display apparatus 2000 includes a television and a monitor. In addition, according to the present invention, the display apparatus 2000 should be inclusively construed as a generic concept including all devices to output an image signal.

Recently, in the display apparatus 2000, a CRT (a display device to form a visible image using electrons emitted from a cathode ray, that is, a cathode in vacuum through a high-vacuum electron tube) is rapidly replaced with a liquid crystal display (LCD) or a plasma display panel (PDP). The LCD or PDP type of the display apparatus 2000 is innovatively reduced in thickness as compared with that of the conventional CRT type of the display apparatus 2000. The flat panel display apparatus 2000 employing the LCD or the PDP may be mounted in a stand type or a wall-mount type for the use thereof. In this case, the display apparatus 2000 is fabricated to have a frame-shaped outer appearance and utilized as an interior accessory.

Figure 2:
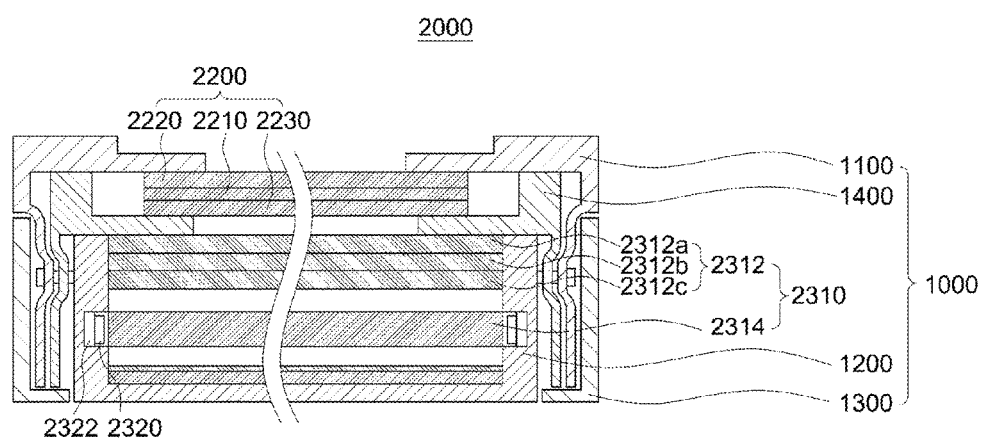
FIG. 2 is a sectional view showing the display apparatus according to one embodiment of the present invention.

FIG. 1 is an exploded perspective view showing a display apparatus 2000 according to one embodiment of the present invention. FIG. 2 is a sectional view showing the display apparatus 2000 according to one embodiment of the present invention.

Referring to FIGS. 1 and 2, the display apparatus 2000 may include a housing 1000, a display panel 2200, and a backlight unit 2300.

The housing 1000 receives the display panel 2200 and the backlight unit 2300 therein to protect them from external impact. In addition, the housing 1000 has a function of matching the display panel 2200 with the backlight unit 2300.

In this case, the housing 1000 may include a case top 1100, a cover bottom 1200, a side frame 1300, and a guide frame 1400.

The case top 1100 covers a front surface of the display apparatus 2000, and the cover bottom 1200 covers a rear surface of the display apparatus 2000. In addition, the side frame 1300 covers the coupling part between the case top 1100 and the cover bottom 1200 to prevent a coupling member 1500, which couples the case top 1000 to the cover bottom 1200, from being exposed through the outer portion of the display apparatus 2000. The guide frame 1400 is interposed between the case top 1100 and the cover bottom 1200. In this case, the display panel 2200 may be fixedly inserted between the case top 1100 and the guide frame 1400. The case top 1100 is coupled to the cover bottom 1200 in such a manner that the cover bottom 1200 is inserted into the case top 1100.

The display panel 2200 and the backlight unit 2300 are embedded in the housing 1000 to be protected from external impact by the housing 1000.

The details of the housing 1000 will be described later.

The display panel 2200 displays an image by using light output from the backlight unit 2300.

The display panel 2200 may include two transparent substrates 2220 and 2230, and a liquid crystal layer 2210 interposed therebetween. In this case, the transparent substrates 2220 and 2230 may be a thin film transistor (TFT) substrate 2200 and a color filter substrate 2230, respectively.

The alignment of the liquid crystal layer 2210 is changed according to an electrical signal. Accordingly, the liquid crystal layer 2210 selectively transmits the light output from the backlight unit 2300 to display an image in the unit of a pixel.

The TFT substrate 2200 may supply the electrical signal to the liquid crystal layer 2210 to adjust the light transmission of the liquid crystal layer 2210. In detail, the TFT substrate 2200 may include a plurality of gate lines and a plurality of data lines crossing the gate lines.

The color filter substrate 2230 may apply color to the light transmitted through the liquid crystal layer 2210. The color filter substrate 22340 may include red-green-blue color filters corresponding to pixels, a black matrix to cover gate lines, data lines, and thin film transistors, and a common electrode to cover the entire portion of the substrate.

The backlight unit 2300 outputs light to a rear portion of the display panel 2200, so that the display panel 2200 may output an image.

The backlight unit 2300 may include optical sheets 2310, a light source 2320, and a reflective plate 2332.

The optical sheets 2310 are arranged in the rear portion of the display panel 2200 while facing the display panel 2200. The optical sheets 2310 may be arranged in such a manner that at least one optical sheet is stacked. In this case, the optical sheets 2310 may include a light guide panel 2314, a diffusion sheet or a prism sheet. For example, the optical sheet 2310 may include a vertical prism panel 2321a, a horizontal prism panel 2312b, a diffusion sheet 2322c, and the light guide panel (LGP) 2314 sequentially from the near side of the display panel 2200 as shown in FIGS. 1 and 2. However, all of the optical sheets 2310 need not be essentially provided, and need not be arranged in the above-described sequence.

The light source 2320 outputs light to be irradiated into the rear portion of the display panel 2200. In the case of an edge-type backlight unit 2300, the light source 2320 may be arranged in parallel to the lateral side of the light guide panel 2314. In detail, a light source array substrate 2322 may be provided in opposition to one lateral side of the light guide panel 2314, and the light source 2320 may be mounted on the light source array substrate 2322. Light sources 2320 may be aligned in line with each other on the light source array substrate 2322. The light source 2320 may be provided in the form of a cold cathode fluorescent lamp (CCFL), an external electrode fluorescent lamp (EEFL) or a light emitting diode (LED).

The reflective plate 2332 may be arranged to face the display panel 2200 while interposing the optical sheets 2310 therebetween. According to one example, as shown in FIGS. 1 and 2, the reflective plate 2332 may be formed on the lower substrate 2330 to be attached to the cover bottom 1200. The reflective plate 2332 may reflect light output from a rear surface of the light guide panel 2314 to the display panel 220. Accordingly, light loss can be reduced, so that the whole display brightness can be improved.

Hereinafter, the housing 1200 according to one embodiment of the present invention will be described in more detail.

Figure 3:
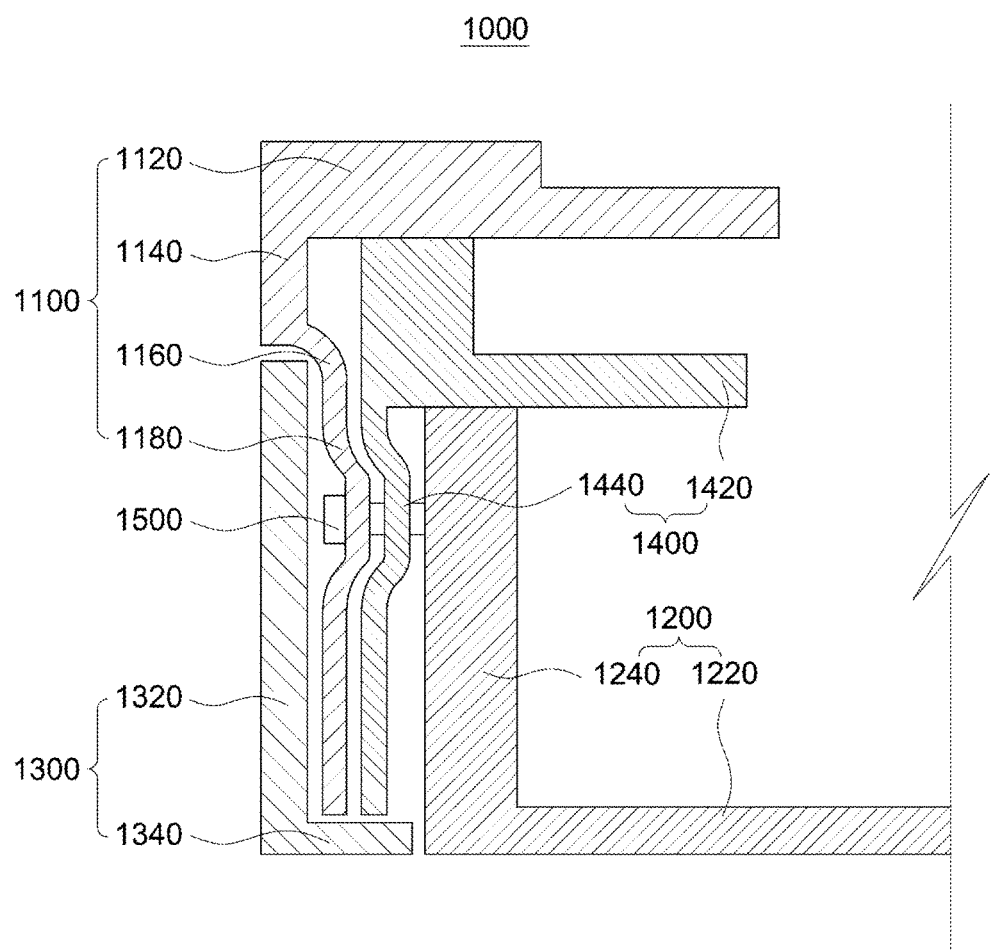
FIG. 3 is a sectional view showing a housing according to one embodiment of the present invention.

FIG. 3 is a sectional view showing the housing 1000 according to one embodiment of the present invention.

Referring to FIG. 3, the housing 1000 may include the case top 1100, the cover bottom 1200, the side frame 1300, and the guide frame 1400. The case top 1100 covers the front surface of the display apparatus 2000, and the cover bottom 1200 covers the rear surface of the display apparatus 2000. In addition, the side frame 1300 covers the coupling part to couple the case top 1100 to the cover bottom 1200 to prevent the coupling part from being exposed through the outer portion of the display apparatus 2000. The guide frame 1400 allows the display panel 2200 to be received and fixed into the housing 1000.

The case top 1100 includes a bezel part 1120, an upper sidewall part 1140, a link wall part 1160, and a lower sidewall part 1180.

The bezel part 1120 covers edges of a front surface of the display panel 2200. The bezel part 1120 may have a width varying depending on the shapes of the display panel 2200. In a narrow bezel-type display apparatus 2000, the bezel part 1120 may have a narrow width. If necessary, the bezel part 1120 may be hardly provided or may not be provided in the case top 1100.

The upper sidewall part 1140 is bent from an outer portion of the bezel part 120 to extend in a rear direction. The upper sidewall part 1140 covers an upper portion of the lateral side of the display apparatus 2000.

The link wall part 1160 is bent inward from the upper sidewall part 1140. The link wall part 1160 may extend perpendicularly to the extension direction of the upper sidewall part 1140 or may inclinedly extend in the rear direction. In addition, the link wall part 1160 may extend in a straight line while maintaining a predetermined angle or may extend in a curved shape, so that the link wall part 1160 is rounded. The shape of the link wall part 1160 may be varied depending on the thickness and the size of the display apparatus 2000 and components received in the display apparatus 2000.

The lower sidewall part 1180 may extend in the rear direction from the link wall part 1160. Meanwhile, the lower sidewall part 1180 may be coupled to the cover bottom 1200, which is to be described later, by a coupling member 1500 such as a screw, a bolt, and a nut. The lower sidewall part 1180 may be formed therein with an insertion hole into which the coupling member 1500 is inserted, and the coupling part may be recessed inward. Accordingly, when the coupling member 1500 is inserted into the insertion hole, the head portion of the coupling member 1500, such as a screw or a bolt, may be prevented from protruding out of the lower sidewall part 1180.

The cover bottom 1200 may cover the rear surface of the display apparatus 2000 to receive the backlight unit 2300.

The cover bottom 1200 may include a bottom part 1220 and an inner sidewall part 1240, and may be provided in the shape of a box having an opening facing the bottom part 1220.

The bottom part 1220 may be provided in the form of a panel facing the rear surface of the display panel 2200, and corresponds to a bottom of the box. Members such as a reflective plate 2332 and a lower substrate may be mounted on the bottom part 1220.

The inner sidewall part 1240 may be bent from an outer portion of the bottom part 1220 to extend in the forward direction. In this case, the inner sidewall part 1240 may be fitted to the inner portion of the lower sidewall part 1180 of the case top 1100.

The light source 2320 may be mounted at the inside of the inner sidewall part 1240, and may include an LED. When the light source 2320 is mounted, the light source 2320 is not independently mounted, but mounted on a member, such as a light source housing and mounted on the inner sidewall part 1240. A heat radiation member may be received at the inside of the bottom part 1220. The heat radiation member may discharge out heat emitted from the light source 2320.

The side frame 1300 may cover a lateral side and a rear surface of the display apparatus 2000.

The side frame 1300 may include an outer sidewall part 1320 and a rear edge part 1340.

The outer sidewall part 1320 extends from a lower end of the upper sidewall part 1140 to a lower end of the inner sidewall part 1240 to cover the lower portion of the lateral side of the display apparatus 2000. Accordingly, the lateral side of the display apparatus 2000 may be completely covered with the upper sidewall part 1140 of the top case 1100 and the outer sidewall part 1320 of the side frame 1300. In this case, the outer sidewall part 1320 has an outer surface aligned in line with that of the upper sidewall part 1140.

Figure 4:
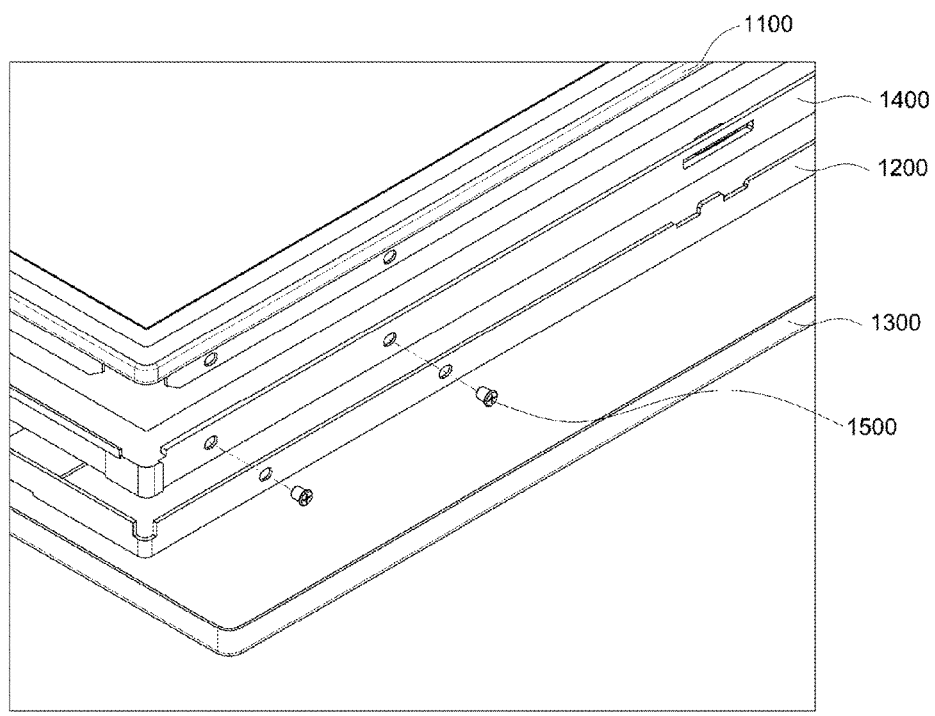
FIG. 4 is an exploded perspective view showing the housing according to one embodiment of the present invention.
Figure 5:
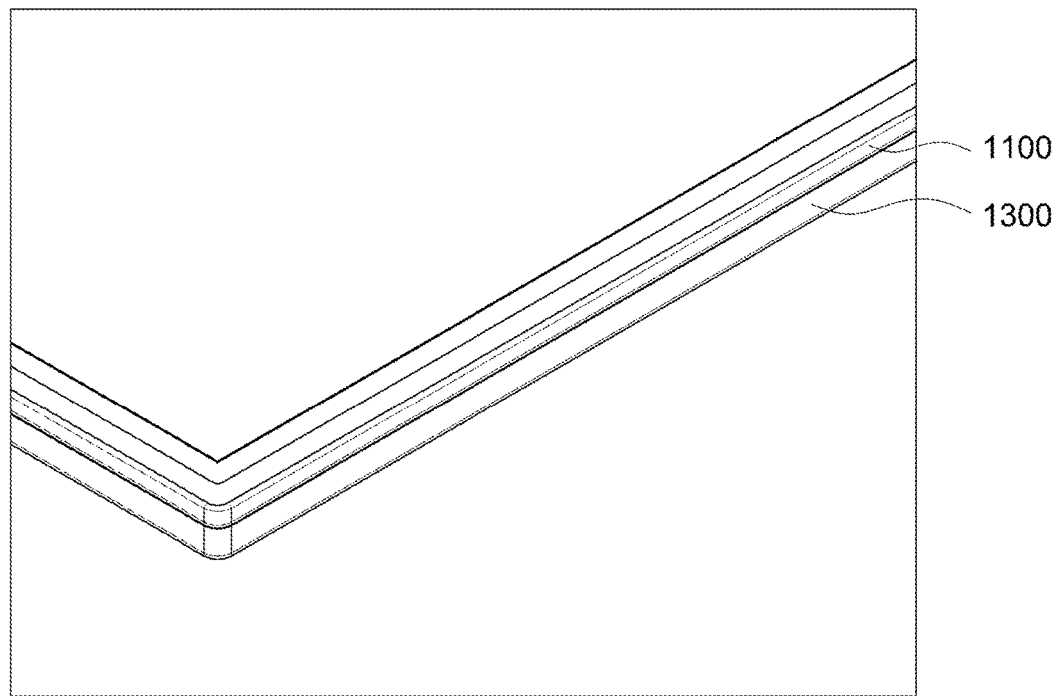
FIG. 5 is a perspective view showing the housing according to one embodiment of the present invention.

FIG. 4 is an exploded perspective view showing the housing 1000 according to one embodiment of the present invention. FIG. 5 is a perspective view showing the housing 1000 according to one embodiment of the present invention. Referring to FIG. 4, when there is no side frame 1300, the coupling member 1500 to couple the case top 1100 to the cover bottom 1200 is exposed to the outer portion of a product. In detail, when the coupling member 1500 includes a screw or a bolt, the head of the screw or the bolt is exposed to the outer portion of the product. When the coupling part is exposed as described above, the aesthetic sensibility for the display apparatus 2000 may be greatly degraded. On the contrast, referring to FIG. 5, the side frame 1300 covers the coupling part between the case top 1100 and the cover bottom 1200 to prevent the coupling member 1500 from being exposed to the outer portion of the product. As described above, the side frame 1300 covers the lower portion of the lateral side of the product, so that the aesthetic sensibility for the article may be greatly improved.

The rear edge part 1340 may cover edges of the rear surface of the display apparatus 2000. In addition, the rear edge part 1340 may extend from the lower end of the outer sidewall part 1320 to the outer portion of the bottom part 1220. Accordingly, the entire sectional surface of the side frame 1300 may be provided in an L shape.

Meanwhile, the side frame 1300 may be provided in a linear line shape or a C shape in addition to the L shape. In this case, the side frame 1300 may have various shapes as long as the side frame 1300 covers the coupling member 1500 to couple the case top 1100, the guide frame 1400, and the cover bottom 1200 to each other so that the coupling member 1500 is not exposed to the outside. In detail, in the case of the straight-shape side frame 1300, the rear edge part 1340 may be omitted. In addition, the C-shape side frame 1300 may further include a top edge part (not shown) bent from the upper end of the outer sidewall part 1320 to extend inwardly.

The side frame 1300 may have the shape of rectangular frame having a thin thickness when viewed from the front of the display apparatus 2000. The side frame 1300 is press-fitted to be fixed to an outer portion of the lower sidewall part 1180 when mounted on the outer portion of the lower sidewall part 1180. Accordingly, an inner length of the side frame 1300 may be equal to a length of the lower sidewall part 1180 or may be smaller than the length of the lower sidewall part 1180 by a predetermined tolerance. In addition, the side frame 1300 must have a sufficient height so that the coupling member 1500 to couple the case top 1100 to the cover bottom 1200 is not exposed to the outer portion of the display apparatus 2000.

Meanwhile, the side frame 1300 may be provided in a color different from that of the case top 1100 so that the aesthetic sensibility may be improved.

The guide frame 1400 supports the display panel 2200. The guide frame 1400 includes a support part 1420 and a coupling wall part 1440.

The support part 1420 has the shape of a rectangular frame to support the edges of the display panel 2200.

The coupling wall part 1440 is interposed between the lower wall part 1180 of the case top 1100 and the inner sidewall part 1240 of the cover bottom 1200 to be fixed by the coupling member 1500. Meanwhile, the coupling wall part 1440 may not be fixed by the coupling member 1500, but fixed by force of fastening the lower sidewall part 1180 and the inner sidewall part 1240 by the coupling member 1500.

Hereinafter, the display apparatus 2000 according to the modification of the present invention will be described in detail.

Figure 6:
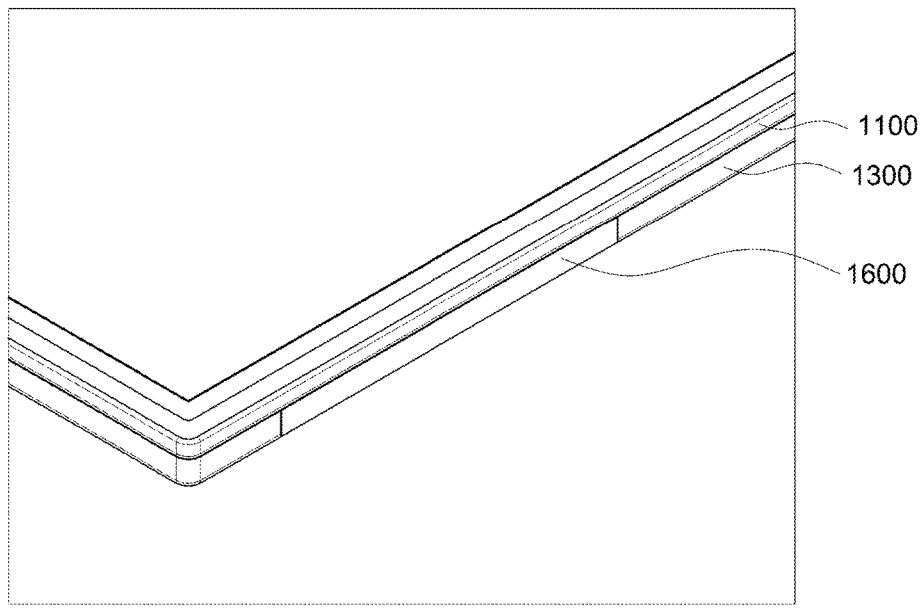
FIG. 6 is a perspective view showing a display apparatus according to the modification of the present invention.
Figure 7:
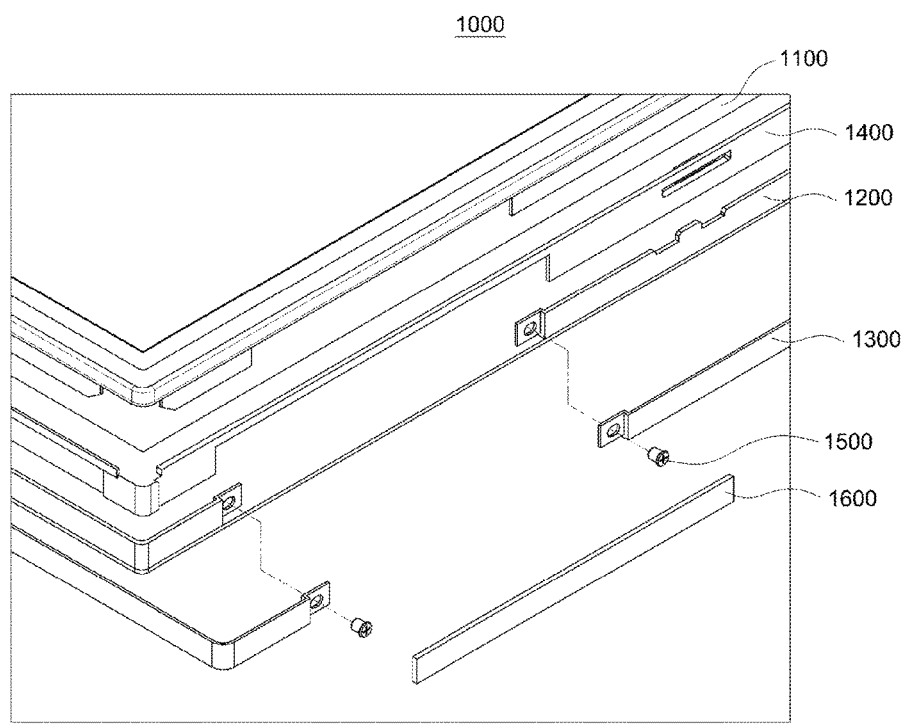
FIG. 7 is an exploded perspective view showing the display apparatus according to the modification of the present invention.

FIG. 6 is a perspective view showing the display apparatus 2000 according to the modification of the present invention. FIG. 7 is an exploded perspective view showing the display apparatus 2000 according to the modification of the present invention.

Referring to FIGS. 6 and 7, the cover bottom 1200, the guide frame 1400, the case top 1100, the coupling member 1500, and the side frame 1300 may be sequentially assembled. In this case, the configuration is identical to that described with reference to FIG. 3 other than the side frame 1300.

The side frame 1300 may be provided in the shape of a rectangular frame having one region that is open when viewed from the front of the display. Both end portion of the open region of the side frame 1300 may be coupled to the case top 1100. In addition, an illuminance sensor 1600 or a receiving module is inserted into the open region and fixed. The illuminance sensor 1600 may include an ambient light sensor (ALS) lens, and the ALS lens detects ambient light of the display device 2000 to adjust the brightness of the display panel 2200 depending on the brightness of the ambient light. Accordingly, when the ALS lens is mounted, power consumption may be efficiently reduced.

The receiving module may receive a remote control signal or a short-distance signal. Accordingly, the display apparatus 2000 may be controlled by a remote controller, and a Bluetooth function and a Wi-Fi function of the display apparatus 2000 are available.

The housing 1000 may be assembled in the following manner. First, the inner sidewall part 1240 of the cover bottom 1200 is arranged to meet the coupling wall part 1440 of the guide frame 1400. Next, the lower sidewall part 1180 of the case top 1100 is arranged to meet the coupling wall part 1440 of the guide frame 1400. In this case, the inner sidewall part 1240 of the cover bottom 1200, the coupling wall part 1440 of the guide frame 1400, and the lower sidewall part 1180 of the case top 1100 may be arranged in parallel to each other. The inner sidewall part 1240 of the cover bottom 1200, the coupling wall part 1440 of the guide frame 1400, and the lower sidewall part 1180 of the case top 1100 are arranged in parallel to each other and then coupled to each other by using the coupling member 1500. The inner sidewall part 1240 of the cover bottom 1200, the coupling wall part 1440 of the guide frame 1400, and the lower sidewall part 1180 of the case top 1100 are coupled to each other and then the side frame 1300 is mounted to cover the coupling member 1500. The side frame 1300 is coupled in a press-fitting manner, or both ends of the open region may be fixed to the case top 1100 by using the coupling member 1500. In addition, the illuminance sensor 1600 or the receiving module is inserted into the open region of the side frame 1300 and coupled.

The coupling member 1500 of the housing 1000 coupled in the same manner is not exposed to the outer portion of the display apparatus 2000, so that the aesthetic sensibility for the design can be improved.

The above description is to simply illustrate the technical scope of the present invention and various modifications and substitutions can be made by those skilled in the art without departing from the scope of the present invention. Therefore, the embodiments of the present invention described above may be implemented independently or in combination with each other.

Therefore, the embodiments disclosed in the present invention do not intend to limit the technical scope of the present invention, but to explain the present invention, and the technical scope of the present invention will not be limited by the embodiments, but shall be interpreted as defined in the claims. All technical scopes within the scope of the claims should be interpreted to be included within the scope of the present invention.

The invention claimed is:

1. A housing comprising:
a case top comprising a bezel part to cover edges of a front surface of a display panel including a substrate and a liquid crystal layer, an upper side wall bent in a rear direction from an outer portion of the bezel part to cover an upper portion of a lateral side of a display apparatus, a link wall part bent inward from a lower end of the upper side wall part toward the display panel, and a lower sidewall part extending in the rear direction from the link wall part;
a cover bottom comprising a bottom part to cover a rear surface of the display apparatus and an inner sidewall part extending in a forward direction from an outer portion of the bottom part, and screw-coupled to an inner portion of the lower sidewall part to be provided in a shape of an open box; and
a side frame provided at an outer portion of the lower sidewall part to cover a lower lateral side of the display apparatus to prevent the screw-coupled inner portion of the lower sidewall part from being exposed outside the housing wherein the side frame comprises a rear edge part that extends from a lower end of the outer sidewall part toward an outer portion of the bottom part to cover an edge of the rear surface of the display apparatus such that the side frame is provided in an L shape, and wherein an end of the rear edge part is spaced apart from the outer portion of the bottom part; a guide frame interposed between the lower sidewall part and the inner sidewall part to support an optical member, and wherein the guide frame includes a support part having a top surface directly connected to the bezel part and a bottom surface directly connected to a top of the inner sidewall part, and a coupling wall part extending downward along with the lower sidewall part and a bottom end of the coupling wall part is adjacent to an inner surface of the rear edge part of the side frame.

2. The housing of claim 1, wherein the side frame comprises an outer sidewall part that extends from a position adjacent to a lower end of the upper sidewall part to another position adjacent to a lower end of the inner sidewall part to cover the lower lateral side of the display apparatus.

3. The housing of claim 2, wherein the outer sidewall part is positioned in line with an outer surface of the upper sidewall part.

4. The housing of claim 2, wherein the side frame is provided in a shape of a rectangular frame to surround the lower sidewall part when viewed from a front view.

5. The housing of claim 4, wherein the rectangular frame includes a cut-out disposed on the outer sidewall part.

6. The housing of claim 5, wherein the side frame is coupled to the case top at a portion adjacent to the cut-out.

7. The housing of claim 5, further comprising an illuminance sensor mounted in the cut-out, thereby forming the rectangular frame, wherein the illuminance sensor is configured to detect external illuminance.

8. The housing of claim 5, further comprising a receiving module mounted in the cut-out, thereby forming the rectangular frame, wherein the receiving module is configured to receive a remote control signal or a short-distance signal.

9. A display apparatus comprising:
a display panel including a substrate and a liquid crystal layer to output an image;
a backlight unit to supply light to the display panel; and
a housing to receive the display panel and the backlight unit therein and to form an outer appearance of a product,
wherein the housing comprises:
a case top comprising a bezel part to cover edges of a front surface of the display panel, an upper side wall bent in a rear direction from an outer portion of the bezel part to cover an upper portion of a lateral side of the display apparatus, a link wall part bent inward from a lower end of the upper side wall part toward the display panel, and a lower sidewall part extending in the rear direction from the link wall part;

a cover bottom comprising a bottom part to cover a rear surface of the display apparatus and an inner sidewall part extending in a forward direction from an outer portion of the bottom part, and screw-coupled to an inner portion of the lower sidewall part to be provided in a shape of an open box; and a side frame provided at an outer portion of the lower sidewall part to cover a lower lateral side of the display apparatus to prevent the screw-coupled inner portion of the lower sidewall part from being exposed outside the housing wherein the side frame comprises a rear edge part that extends from a lower end of the outer sidewall part toward an outer portion of the bottom part to cover an edge of the rear surface of the display apparatus such that the side frame is provided in an L shape, and wherein an end of the rear edge part is spaced apart from the outer portion of the bottom part; a guide frame interposed between the lower sidewall part and the inner sidewall part to support an optical member, and wherein the guide frame includes a support part having a top surface directly connected to the bezel part and a bottom surface directly connected to a top of the inner sidewall part, and a coupling wall part extending downward along with the lower sidewall part and a bottom end of the coupling wall part is adjacent to an inner surface of the rear edge part of the side frame.

10. The display apparatus of claim 9, wherein the side frame comprises an outer sidewall part that extends from a position adjacent to a lower end of the upper sidewall part to another position adjacent to a lower end of the inner sidewall part to cover the lower lateral side of the display apparatus.

11. The display apparatus of claim 10, wherein the outer sidewall part is positioned in line with an outer surface of the upper sidewall part.

12. The display apparatus of claim 10, wherein the side frame is provided in a shape of a rectangular frame to surround the lower sidewall part when viewed from a front view.

13. The display apparatus of claim 12, wherein the rectangular frame includes a cut-out disposed on the outer sidewall part.

14. The display apparatus of claim 13, wherein the side frame is coupled to the case top at a portion adjacent to the cut-out.

15. The display apparatus of claim 13, further comprising an illuminance sensor mounted in the cut-out, thereby forming the rectangular frame, wherein the illuminance sensor is configured to detect external illuminance.

16. The display apparatus of claim 13, further comprising a receiving module mounted in the cut-out, thereby forming the rectangular frame, wherein the receiving module is configured to receive a remote control signal or a short-distance signal.

* * * * *